United States Patent
Walton

[15] 3,640,321
[45] Feb. 8, 1972

[54] PROTECTIVE SHIELD FOR LATHE
[72] Inventor: Charles L. Walton, 15014 Commerce Station, Minneapolis, Minn. 55415
[22] Filed: May 15, 1970
[21] Appl. No.: 37,695

[52] U.S. Cl. .................................. 142/55, 142/49, 82/34
[51] Int. Cl. ............................................. B27c 7/00
[58] Field of Search ............... 142/55, 49, 1, 21, 46; 82/34; 143/159 J; 144/251 R

[56] References Cited

UNITED STATES PATENTS 2,469,531  5/1949  Toth et al. ............................. 82/34
1,217,838  2/1917  Schmidt ................................. 82/34

*Primary Examiner*—Leonidas Vlachos
*Attorney*—Stryker and Jacobson

[57] ABSTRACT

A protective transparent shield protects a lathe operator against flying chips and the like yet contains an opening through which the operator can pass a tool for working on the workpiece. The base of the shield frame is provided with a surface for guiding and resting the tool and also a groove for guidance and protection of the operator's hands as he manipulates the tool.

4 Claims, 3 Drawing Figures

PATENTED FEB 8 1972
3,640,321
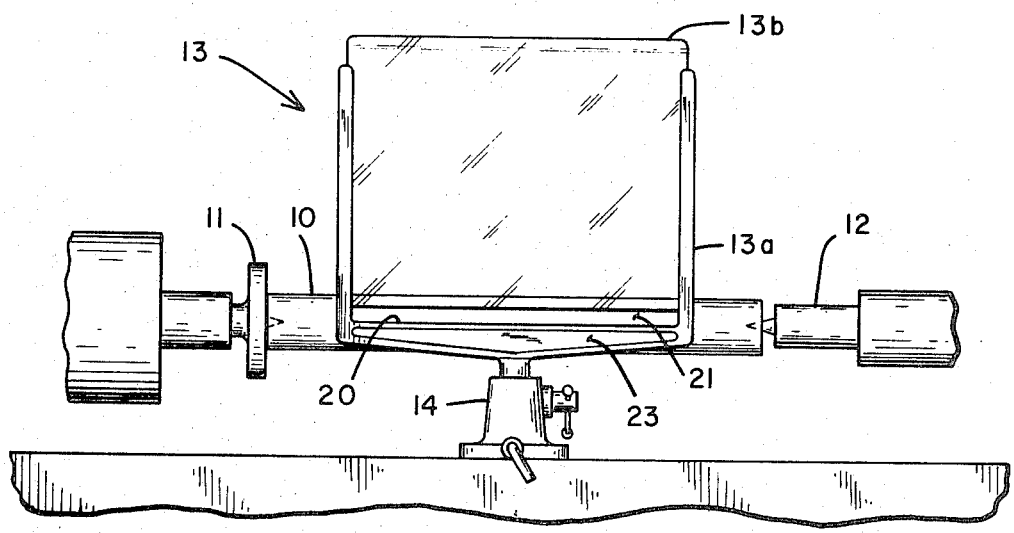
Fig. 1
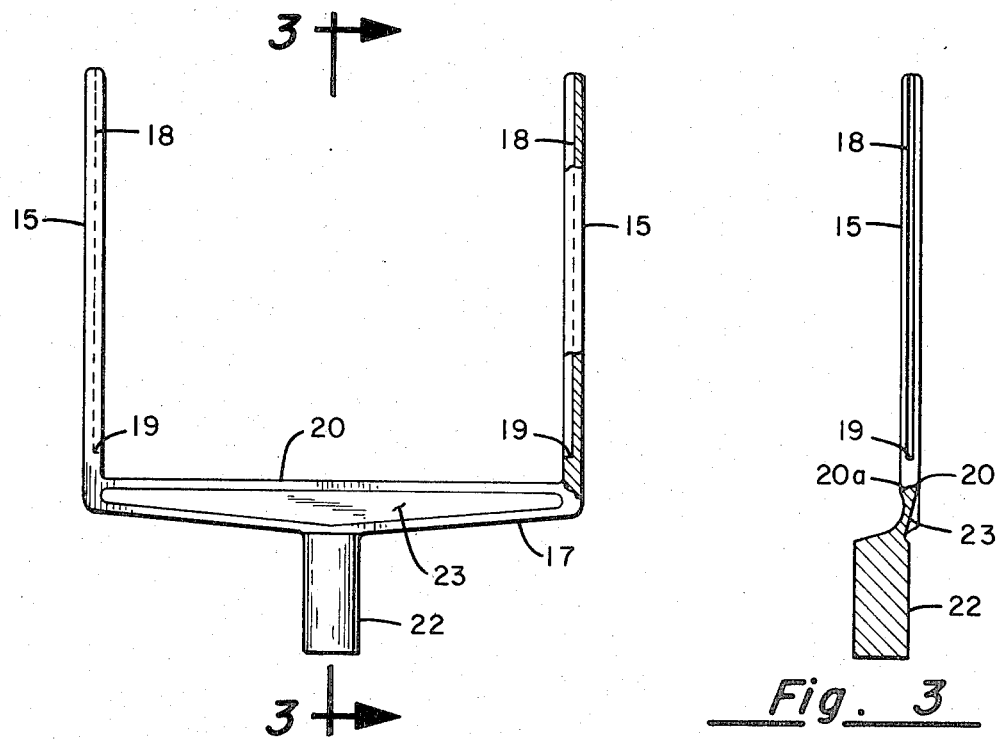
Fig. 2
Fig. 3
INVENTOR
CHARLES L. WALTON
BY Stryker and Jacobson
ATTORNEYS

PROTECTIVE SHIELD FOR LATHE

BACKGROUND OF THE INVENTION

This invention is directed toward the machine tool industry and particularly toward protective shields used in conjunction with lathes, especially woodworking lathes.

There are a number of transparent protective shields for lathes in use today. There are also a number which appear in the prior art, for example, as shown in U.S Pat. No. 2,469,531, and No. 3,204,499 and British Pat. No. 550,938. However, the present invention has advantages over these prior art devices because of its simplicity, its relatively inexpensive cost, its relatively small size and its features for the convenience of the lathe operator.

SUMMARY

A rigid transparent sheet of protective material is held in a frame located between the lathe operator and the workpiece with the frame being adjustably mounted on the lathe bed in some convenient fashion. A space or opening is provided between the bottom edge of the transparent sheet and the base of the frame through which the operator can insert a tool for working on the workpiece while resting the tool on the top surface of the base and having his hands and fingers guided and protected by a groove in the base of the frame.

BRIEF DESCRIPTION OF THE DRAWING

FIG. 1 illustrates a preferred embodiment of the invention as it might be mounted on a lathe with respect to the workpiece;

FIG. 2 is a partial breakaway front view of the frame of the preferred embodiment of this invention; and FIG. 3 is a view taken along viewing line 3—3 of FIG. 2.

DESCRIPTION OF THE PREFERRED EMBODIMENT

Typically, in a wood lathe a workpiece 10 is held between a headstock 11 and a tailstock 12 and during operation of the lathe the headstock 11 is driven by a motor, not shown, causing the workpiece to rotate about the axis of the headstock. A short distance away from the workpiece 10 towards the operator is located the protective shield 13. Although it is contemplated that the shield 13 may be mounted on the lathe bed in various fashions, it is preferred that it be mounted in the manner shown, securely held in position when releasable clamp 14 is tightened but yet maneuverable to some degree as needed. Clamp 14 may be attached in any convenient fashion to the bed of the lathe.

The protective shield 13 comprises generally an outer frame 13a and a transparent, rigid sheet of protective material 13b. Preferably the frame 13a is cast out of Almag 35 alloy. This material is preferred because it has the characteristics of being relatively light yet very strong and has superior shock and impact resistance. The material for the transparent protective sheet is preferably extra-heavy clear acrylic.

Turning next to FIGS. 2 and 3, the frame 13a of protective shield 13 has a pair of upstanding arms 15 which are joined together at their lower ends by a base member 17. Each of the arms 15 contains a slot or groove 18 formed on its inner face, the slot 18 extending from the top free or open end of the arm down the length of the arm, terminating a short distance above the base member 17 forming a ledge or rest 19. The transparent rigid sheet 13b is inserted in the slots 18 from the top end of the arms and its lower end rests on ledges 19 when in position. The bottom edge of the transparent sheet material 13b and the top surface 20 of the base member 17 define an opening or gap 21 (FIG. 1) which extends along the width of the protective shield 13 from one arm 15 to the other. Gap 21 provides an opening through which the lathe operator can insert a working tool to operate on the workpiece which is located on the other side of the protective shield 13, as illustrated in FIG. 1. The top surface 20 of the base 17 is milled smooth and flat to form a rest and a guide for the tool as it is held by the operator when inserted through the gap 21 toward the workpiece. To permit the operator more flexibility in maneuvering the work tool, part of the upper surface of the base 17 is also milled at a downward angle as illustrated and shown more clearly at 20a in FIG. 3.

On the operator's side of the protective shield 13 in base 17, is a groove or recess 23. This groove or recess serves a twofold purpose. One, it is used to guide the operator's fingers or hands as he is holding the work tool. For example, the operator may have a cutting tool inserted through gap 21 and he may want to move the tool from left to right to make a certain cut or pattern in the workpiece. While holding the work tool in his hand and resting it on surface 20 for stability, while he draws the tool across the workpiece his fingers move across in the recess 21, guided in a straight line. At the same time, the operator's fingers resting in the recess 21 base member 17 are protected against sliding through the gap toward the workpiece and are protected against any chips or the like which might fly off the workpiece as it is being worked.

Extending down from the general center of the base 17 is a cylindrical post member 22 which is adaptable for insertion into clamp 14 (FIG. 1) for mounting the protective shield 13 onto the lathe bed. The cylindrical or post construction for the mounting member 22 provides some degree of flexibility so that the shield can be swung 360°, although generally it would only be swung in an arc of 90°. This would be necessary in the event the workpiece were to be worked on when attached only to the headstock 11 of the lathe, such as in the case of a disc being machined by the operator.

As mentioned earlier, it is preferred that the frame 13a be cast although it is contemplated that the individual parts, such as arms 15 and base 17, may be made separately and then joined together by welding or the like.

We claim:

1. A safety protective shield for a lathe, comprising, in combination:
   a. a rigid frame having a pair of upstanding arms joined together by a base member;
   b. each arm containing a slot formed on its inner side, said slot terminating a short distance above the base member;
   c. a rigid sheet of transparent protective material located between said arms engaged in said slots resting on the ends of said slots, the bottom of the transparent sheet and the top of the base member forming a gap through which a work tool may be inserted from the operator's side of the safety shield to a workpiece on the lathe;
   d. means on said base member adaptable for mounting the safety shield on a lathe bed; and
   e. said base member containing a groove formed on the operator's side of the base member for guiding and protecting the the operator's hand as he holds a work tool against the workpiece through the gap.

2. The invention as set forth in claim 1, wherein: the base member has a substantially flat, horizontal upper surface for guiding and supporting a work tool and said guide groove extends substantially parallel to said upper surface.

3. The invention as set forth in claim 1, wherein said mounting means comprises a cylindrical member extending downward from the central underside of the base member.

4. The invention as set forth in claim 2 wherein that part of the upper surface of the base member nearest the operator is substantially horizontal and that part which is nearest the workpiece is angled downward for providing support and guidance for the work tool.

* * * * *